United States Patent [19]

Tyler

[11] Patent Number: 4,554,617
[45] Date of Patent: Nov. 19, 1985

[54] ADJUSTABLE LAMP ASSEMBLY

[75] Inventor: David O. Tyler, Anderson, Ind.

[73] Assignee: General Motors Corporation, Detroit, Mich.

[21] Appl. No.: 663,411

[22] Filed: Oct. 22, 1984

[51] Int. Cl.⁴ ............................................. B60Q 1/06
[52] U.S. Cl. ..................................... 362/61; 362/418
[58] Field of Search ................ 362/418, 269, 61, 368, 362/372, 371

[56] References Cited

U.S. PATENT DOCUMENTS

| | | | |
|---|---|---|---|
| 3,385,546 | 5/1968 | Scowen | 362/418 |
| 3,752,976 | 8/1973 | DiSalvo | 362/418 |
| 4,503,486 | 3/1985 | Makita | 362/61 |

OTHER PUBLICATIONS

General Motors Drawing Part #914640, Guide Division, 1983.

Primary Examiner—Ronald B. Cox
Attorney, Agent, or Firm—Edward J. Biskup

[57] ABSTRACT

A lamp assembly having an adjustment mechanism that connects a lamp unit to a support housing and includes a pair of bosses integral with the opposite sides of the headlamp unit and provided with screw means which cooperate with a pair of nuts that are mounted in a support plate for movement when the screw means are loosened and the lamp unit is manually adjusted about a horizontal axis. When the screw means are tightened, frictional engagement between the nuts and the support plate occurs so that the lamp unit is then maintained in the desired adjusted position.

3 Claims, 6 Drawing Figures

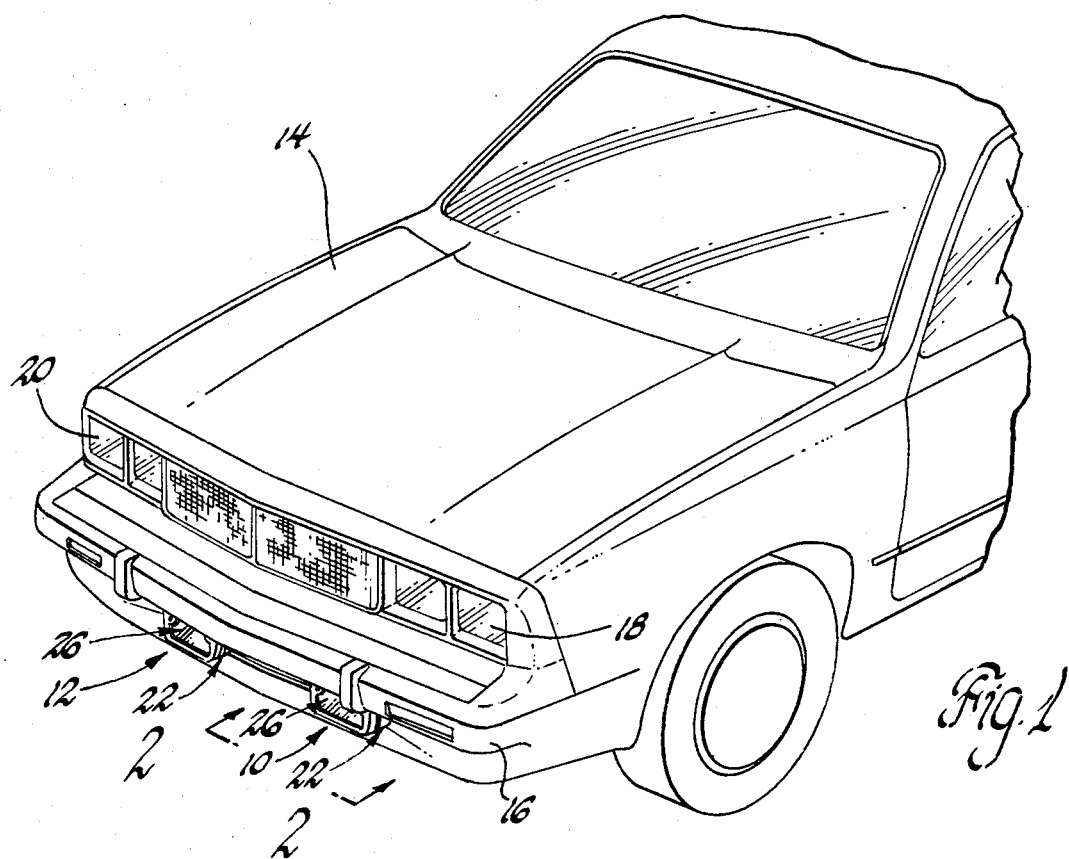
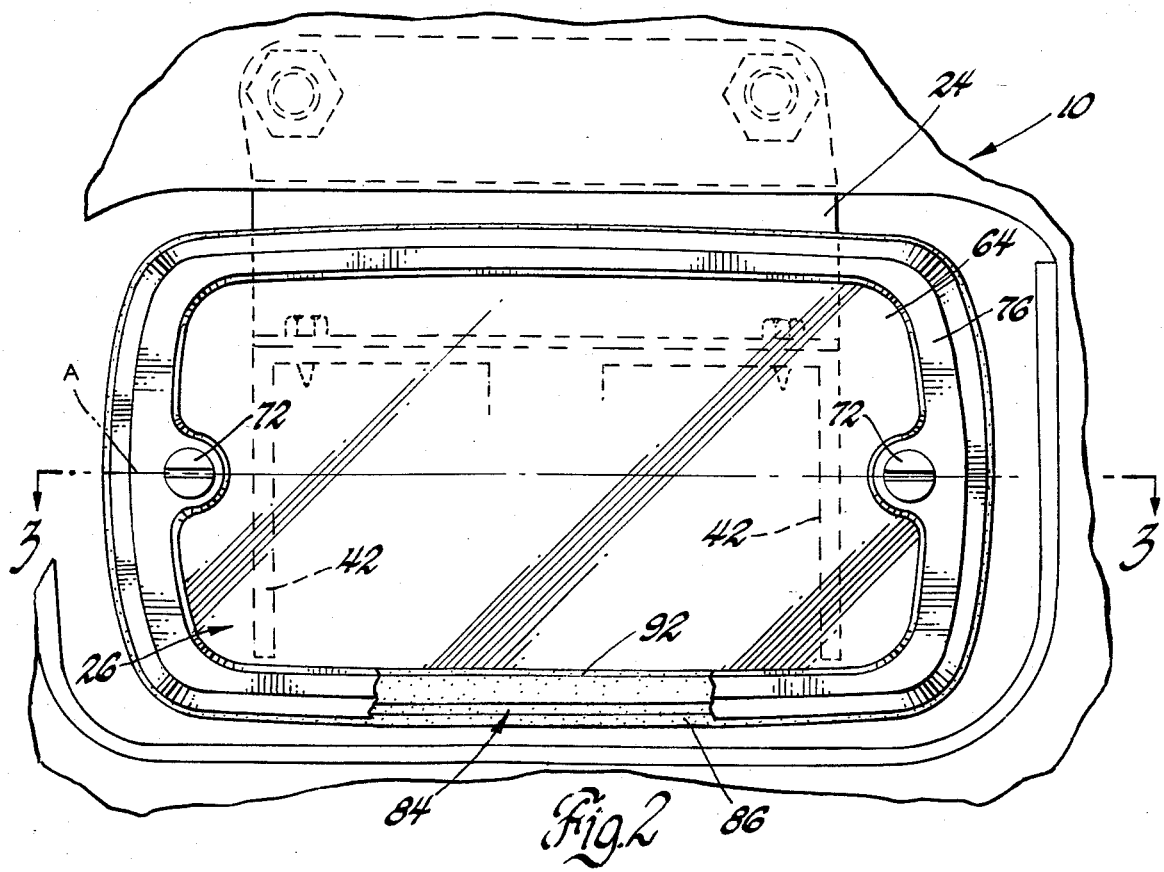

ADJUSTABLE LAMP ASSEMBLY

This invention concerns lamps for automotive vehicles and more particularly relates to a lamp assembly that includes a lamp unit which can be readily adjusted about a horizontal axis so as to provide desired aiming of the light beam emitted by the lamp unit.

More specifically, the lamp assembly, made accordingly to the present invention, includes a support housing adapted to be mounted to a front part of an automobile. A lamp unit, which includes a reflector member and a lens member, is located within the support housing and is connected thereto through an adjustment mechanism which serves to provide adjustable positioning of the lamp unit about a horizontal axis between two extreme positions. The adjustment mechanism includes a pair of bosses which extend rearwardly from the reflector member and are located on opposite sides of the lamp unit. Cooperating pivot means are formed on each of the bosses and on the associated side portions of the support housing for allowing the lamp unit to pivot about the aforementioned horizontal axis. In addition, a screw extends through each of the bosses and is received by a nut supported by a plate for movement along a vertically oriented arcuate slot the ends of which define the aforesaid two extreme positions. Thus, upon tightening each of the screws, the associated nuts are drawn into frictional engagement with the plate so that the lamp unit maintains an adjusted position between the two extreme positions. When the screws are loosened, the lamp unit can be moved manually to a desired adjusted position about the aforementioned horizontal axis after which the screws can again be tightened so that the adjusted position is maintained.

The objects of the present invention are to provide a new and improved lamp assembly that is mountable to the front end of the vehicle and is adjustable about a horizontal axis; to provide a new and improved lamp assembly supported within a housing by an adjustment mechanism which allows positioning of the lamp unit about a horizontal axis between two extreme positions and includes a pair of screw devices that serve to connect a bezel to the lamp assembly and also serve as the fastening means for maintaining the lamp unit in a desired adjusted position between the aforementioned two extreme positions; to provide a new and improved lamp assembly that includes a support housing and a lamp unit both of which are formed with cooperating pivot means for allowing the lamp unit to be adjustably positioned about a horizontal axis and which includes a pair of screws threadably received by nut members movable along an arcuate path having its center at the aforementioned horizontal axis so when the screws are tightened the nut members are frictionally retained in position and the lamp unit maintains the adjusted position; and to provide a new and improved lamp assembly having an adjustment mechanism that includes rearwardly projecting bosses integral with the opposite sides of a rectangular headlamp unit and provided with a pair of apertures for receiving two screws which cooperate with a pair of nuts that mate with the bosses and are mounted in a support plate for movement along an arc so when the screws are loosened the lamp unit can be manually moved about a horizontal axis and when the screws are tightened frictional engagement between the nut and the support plate occurs to maintain the lamp unit in an adjusted position.

Other objects and advantages of the present invention will be more apparent from the following detailed description when taken with the drawings in which:

FIG. 1 is a perspective view of an automotive vehicle equipped with a pair of lamp assemblies made according to the present invention;

FIG. 2 is an enlarged front elevational view taken on line 2—2 of FIG. 1 of one of the headlamp assemblies according to the present invention;

Figure 3:
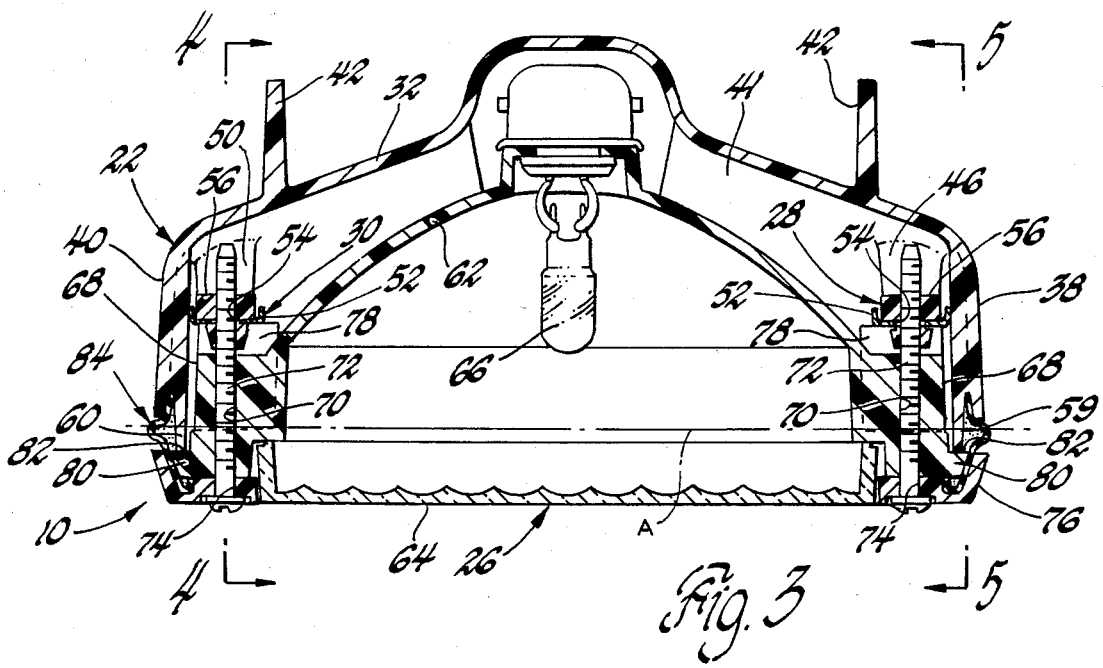
FIG. 3 is a sectional plan view of the lamp assembly of FIG. 2 taken on line 3—3 thereof.

Referring to the drawings and more particularly FIGS. 1 and 2 thereof, a pair of horizontally spaced and identical lamp assemblies 10 and 12, according to the present invention, are shown mounted to the front end of an automobile vehicle 14 below the bumper 16 thereof. The lamp assemblies 10 and 12 serve as additional lighting units for projecting a light forwardly of the vehicle 14 to provide increased illumination under certain conditions. The lamp assemblies 10 and 12 may be illuminated with the lower beam of the conventional headlamps 18 and 20 of the vehicle 14 or switch-controlled in conjunction with the headlamps 18 and 20 and used at the driver's discretion with either the low or high beams of the headlamps 18 and 20.

Each of the lamp assemblies 10 and 12 includes a support housing 22 mounted by a bracket 24 to the vehicle body, as seen in FIGS. 1 and 2, so as to project the light beams therefrom in the forwardly direction. In addition, each of the lamp assemblies 10 and 12 includes adjustment means, to be described hereinafter, which allow the lamp units 26 mounted within the support housing 22 to be pivoted up or down between two extreme positions about a horizontal axis A. Thus, if desired, the light beam emitted from each lamp unit 26 can be raised or lowered when the lamp unit 26 pivots about the horizontal axis A as will be more fully described hereinafter.

In addition to the aforementioned support housing 22 and the lamp unit 26, each of the lamp assemblies 10 and 12 includes an adjustment mechanism that comprises a pair of identical screw devices 28 and 30. The screw devices 28 and 30 serve to connect the lamp unit 26 to the support housing 22 and provide the aforementioned adjustable positioning of the lamp unit 26 about the horizontal axis A.

Figure 4:
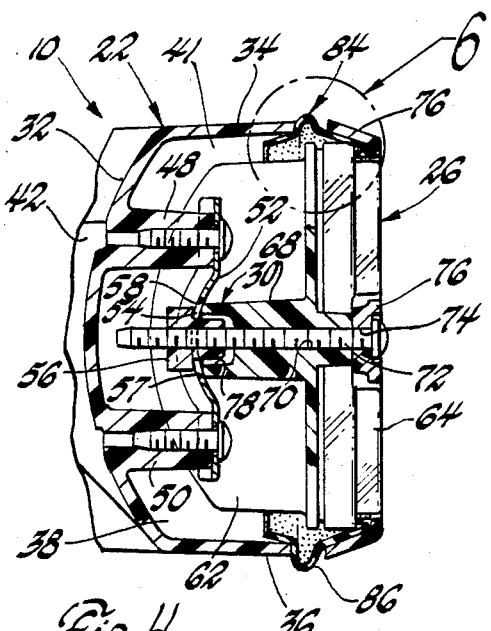
FIG. 4 is a sectional side view of the lamp assembly of FIG. 3 taken on line 4—4 thereof.
Figure 5:
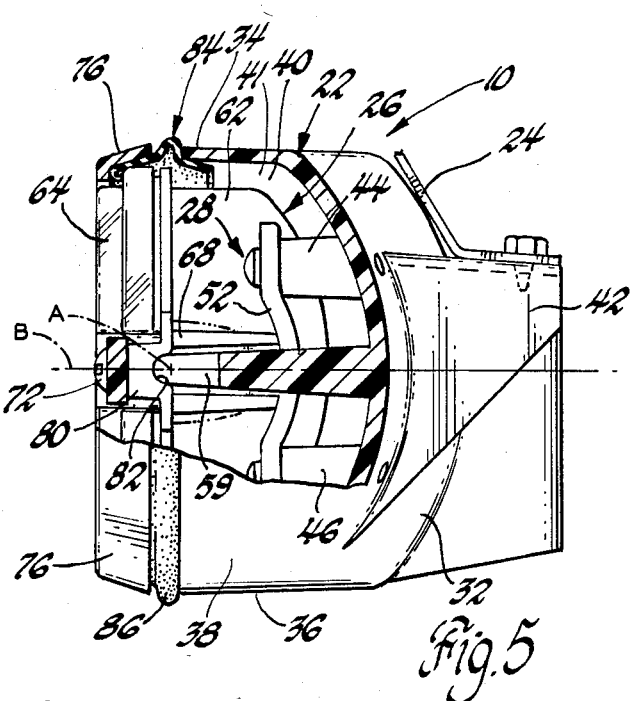
FIG. 5 is another sectional side view of the lamp assembly of FIG. 3 taken on line 5—5 thereof.

More specifically and in the preferred form, the support housing 22 is made of a plastic material and includes a back wall 32, a top wall 34, a bottom wall 36 and a pair of laterally spaced side walls 38 and 40. Each of the walls 32-40 terminates with a front edge that together with the other front edges of the other walls 32-40 defines a rectangular cavity 41 in which the lamp unit 26 is located. As seen in FIG. 5, the outer surface of the back wall 32 has a rearwardly extending flange 42 to which the mounting bracket 24 is attached for mounting the lamp assembly 10 to the vehicle. As seen in FIGS. 4 and 5, the inner surface of the back wall 32 is integrally formed with four forwardly projecting post members 44, 46, 48 and 50, located in vertically spaced pairs. The pairs of post members 44, 46, and 48, 50 are a part of the screw devices 28 and 30, respectively. Each pair of post members 44, 46, and 48, 50 has a curved plate member 52 attached thereto which is centrally provided with a vertical slot 54 that supports a nut 56 for controlled vertical movement between two extreme positions defined by stop surfaces 57 and 58. During such movement, the nut 56 in each instance moves up or down from the full line position seen in FIG. 4 along an arc having the horizontal axis A as its center as seen in FIG. 5. In addition, and as seen in FIGS. 3 and 5, the side walls 38 and 40 are integrally formed with outwardly projecting and tapered pivot members 59 and 60, respectively, which are aligned along the horizontal axis A.

As seen in FIGS. 1 and 2, the lamp unit 26 is rectangular in configuration and includes the usual reflector member 62 and a lens member 64, both of which can be made of a plastic material and bonded together by a suitable adhesive. The reflector member 62 supports a light bulb 66 of the tungsten halogen type which when illuminated provides a forwardly projecting beam of light through the lens member 64. Each side of the reflector member 62 along the horizontal axis A is provided with a rearwardly projecting integral boss 68 having a bore 70 therein which accommodates a screw 72. The threaded shank portion of the screw also extends through a bore 74 formed in the bezel 76 surrounding the lens member 64 and after passing through the bore 70 is received by the associated nut 56 carried by the plate member 52. As seen in FIGS. 3 and 4, the rear end of each boss 68 is formed with a pocket 78 which traps or mates with the forward head end of the associated nut 56. Also, as seen in FIG. 5, the front end of each boss 68 has a laterally outwardly extending portion 80 formed with a concave surface 82 which accommodates the associated pivot member 59 or 60 so as to provide a pivot connection which allows the lamp unit 26 to pivot about the horizontal axis A.

It should be apparent from the above description that the screw devices 28 and 30 along each side of the lamp unit 26 serve to connect the lamp unit 26 together with the bezel 76 to the support housing 22. It should also be apparent that the laterally outwardly extending portion 80 of each boss 68 cooperates with the associated pivot member 59 or 60 to allow the lamp unit 26 to pivot about the horizontal axis A between the two extreme positions as defined by the two stop surfaces 57 and 58 of the slot 54 formed in the curved plate member 52. In this regard, it will be noted that when the screw 72 of each screw device 28 and 30 is loosened, the nut 56 associated therewith is free to move within the slot 54 formed in the curved plate member 52 when the lamp unit 26 is manually pivoted about the pivot connections provided by the pivot members 59, 60 and the associated surfaces 82 on portion 80 of the bosses 68. Such movement of the nut 56, of course, occurs due to the mating engagement of the front head end of the nut 56 with the pocket 78 in the rear end of the associated boss 68. The amount of movement of the nut 56 and, accordingly the lamp unit 26 about the horizontal axis A is determined by the vertical length of the slot 54 which as aforementioned, in this case, terminates at its upper end with stop surface 58 and at its lower end with a stop surface 57. The stop surfaces 57 and 58 are spaced so as to provide the lamp unit 26 with a four degree upper and lower vertical adjustment about horizontal axis A from the center axis B shown in FIG. 5. Once the desired adjusted position of the lamp unit 26 is obtained, each screw 72 of the screw devices 28 and 30 is then tightened so as to cause each nut 56 to be drawn in a direction towards the bezel 76 and against the rear surface of the curved plate member 52. As a result, the frictional engagement between the nut 56 and the plate member 52 cause the lamp unit 26 to maintain the desired adjusted position.

Figure 6:
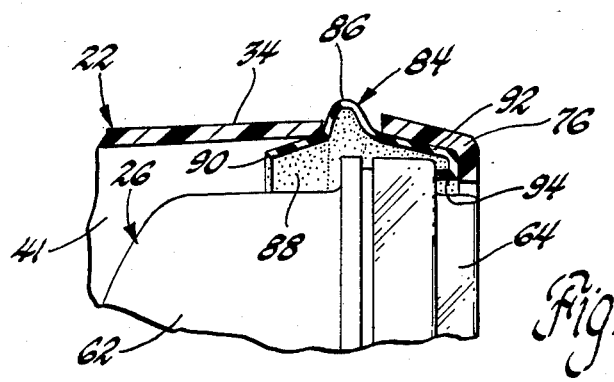
FIG. 6 is an enlarged view of the area of the lamp assembly enclosed within the circle shown in FIG. 4.

As seen in FIGS. 1 through 6, a rectangular seal member 84 is interposed between the bezel 76 and the front wall edges of the support housing 22. The seal member 84 serves to close the gap between the bezel 76 and the front wall edges of the support housing 22 and thereby provides a means for preventing dirt and other foreign material from entering the interior of the support housing 22 while still allowing adjustable movement of the lamp unit 26 about the horizontal axis A. As seen in FIG. 6, the seal member 84 is of uniform cross section having a dome portion 86 normally located in the gap between the bezel 76 and the front wall edges of the support housing 22. The dome portion 86 is integrally formed with a rearwardly extending leg 88 which terminates with an edge 90, and is also formed with a forwardly extending leg 92 that terminates with a radially inwardly extending rim portion 94 against which the bezel 76 is pressed by the force of both of the screws 72 when the latter are tightened.

Although only one form of this invention has been shown and described, other forms will be readily apparent to those skilled in the art. Therefore, there is no intent to limit the scope of this invention by the embodiment selected for the purpose of this disclosure but only by the claims which follow.

The embodiments of the invention in which an exclusive property or privilege is claimed are defined as follows:

1. An adjustable lamp assembly for an automobile, said lamp assembly comprising a support housing, a lamp unit including a reflector member and a lens member, an adjustment mechanism connecting said lamp unit to said support housing for adjustable positioning of said lamp unit between two extreme positions about a horizontal axis, said adjustment mechanism including a pair of bosses extending rearwardly from said reflector member, a bore formed in each of said bosses, cooperating pivot means formed on said bosses and on said support housing for allowing said lamp unit to pivot about said horizontal axis, a screw located in each of said bores in said pair of bosses, a plate member carried by said housing, a nut threadably receiving each screw and supported by said plate member for movement between said two extreme positions along an arc having said horizontal axis as its center so that upon tightening of said screw, said nut is drawn into frictional engagement with said plate member whereby said lamp unit maintains an adjusted position between said two extreme positions.

2. An adjustable lamp assembly for an automobile, said lamp assembly comprising a support housing, a rectangular lamp unit including a reflector member and a lens member, an adjustment mechanism connecting said lamp unit to said support housing for adjustable positioning of said lamp unit between two extreme positions about a horizontal axis, said adjustment mechanism including a pair of bosses extending rearwardly from said reflector member, and located at opposite sides of said lamp unit, a bore formed in each of said bosses, cooperating pivot means formed on said bosses and on said support housing for allowing said lamp unit to pivot about said horizontal axis, a screw located in each of said bores in said pair of bosses, a curved plate member carried by said housing opposite each of said pair of bosses, a nut threadably receiving each screw and supported by each of said plate member for movement between said two extreme positions along an arc having said horizontal axis as its center so that upon tightening of said screw, said nut is drawn into frictional engagement with said plate member whereby said lamp unit maintains an adjusted position between said two extreme positions.

3. An adjustable lamp assembly for an automobile, said lamp assembly comprising a support housing having a back wall, top and bottom walls, and a pair of side walls all of which define a generally rectangular cavity, a rectangular lamp unit including a reflector member and a lens member located within said cavity and a bezel surrounding said lens member, an adjustment mechanism connecting said bezel and said lamp unit to said support housing for adjustable positioning of said lamp unit between two extreme positions about a horizontal axis, said adjustment mechanism including a pair of bosses extending rearwardly from and integrally formed with said reflector member, a bore formed in each of said bosses, cooperating pivot means formed on said bosses and on said side walls of said support housing for allowing said lamp unit to pivot abut said horizontal axis, a screw located in each of said bores in said pair of bosses, a pair of curved plate members carried by said housing, a vertically oriented elongated slot centrally formed in each of said plate members, a nut threadably receiving each screw and supported within said slot of said plate member for movement between said two extreme positions along an arc having said horizontal axis as its center so that upon tightening of said screw, said nut is drawn into frictional engagement with said plate member whereby said lamp unit maintains an adjusted position between said two extreme positions, and seal means located between said support housing and said bezel for preventing dirt and other foreign material from entering the interior of said support housing.

* * * * *